United States Patent Office 3,542,601
Patented Nov. 24, 1970

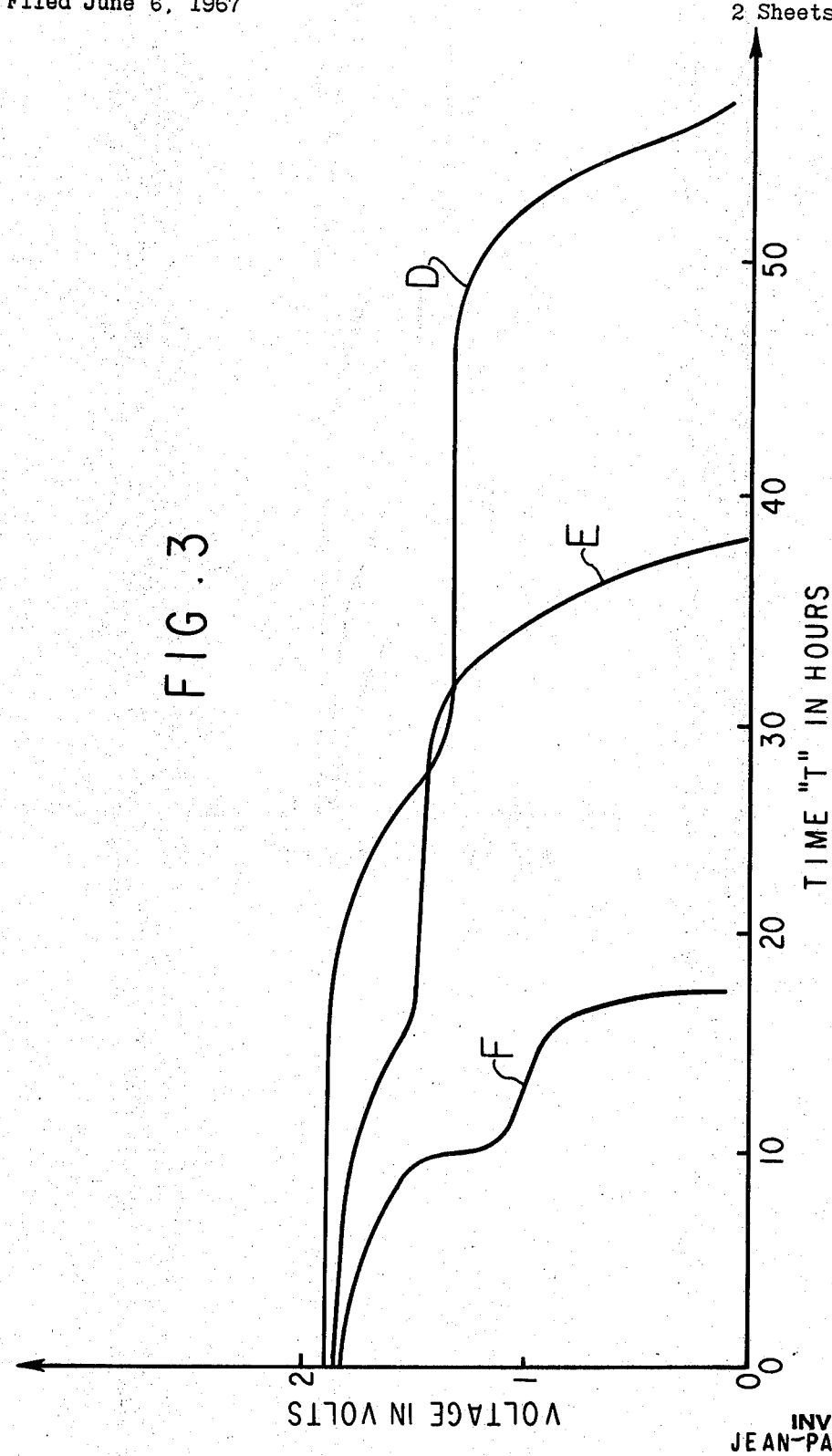

3,542,601
ELECTROCHEMICAL GENERATOR WITH NON-AQUEOUS ELECTROLYTE
Jean-Paul Gabano, Poitiers, France, assignor to Societe des Accumulateurs Fixes et de Traction (Societe Anonyme), Pont de la Folie, Romainville, Seine-Saint-Denis, France, a French company
Filed June 6, 1967, Ser. No. 643,946
Claims priority, application France, June 23, 1966, 66,740, Patent 1,490,726
Int. Cl. H01m *11/00*
U.S. Cl. 136—155
11 Claims

ABSTRACT OF THE DISCLOSURE

A non-aqueous electrolyte of high solvating power for electrochemical generators or cells which include a cathode that is a halide or a sulfide, for example, cupric chloride or cupric sulfide, a separator and an anode of strongly electronegative metal such as an alkali or alkaline earth metal, said electrolyte comprising in combination a solvent of high solvating power which is a heterocyclic organic compound with a saturated cycle selected from the group containing sulfur and oxygen and having electron dissymetry causing a dipole moment of non-null value, being, for example, tetra-hydrofuran, tetra-hydropyran or 4,4-dimethyl-1-3-dioxane, containing dissolved therein a non-hydrated inorganic salt of low lattice energy and high capability of solvation comprising a large anion and a cation of small radius as, for example, a perchlorate selected from the group consisting of lithium, magnesium and potassium perchlorates, or a nitrate selected from the group consisting of lithium, sodium and potassium nitrates, or potassium hexafluorophosphate, the concentration of inorganic salt in the organic compound being in the range of from 0.25 mole to 2 moles of inorganic salt per liter of the organic compound and preferably in the range between 0.5 mole to 1.4 moles of inorganic salt per liter of the organic compound.

---

This invention relates to a non-aqueous electrolyte of high solvating power for electrochemical generators, more particularly for cells comprising an anode constituted by a strongly electronegative metal such as an alkali or alkaline earth metal, a separator and a sulfidic or halidic cathode.

It is well known that in such cells aqueous electrolytes cannot be used because the said metals are strongly attacked by water and displace the hydrogen of the latter while being oxidized.

An answer to this problem consists in using non-aqueous electrolytes comprising an organic solvent having the highest possible dielectric constant.

Such electrolytes operate in the same way as electrolytes obtained from salts, bases or acids dissolved in water. The conductivity of these solutions results from the transfer of electric charges by ions. It is an ionic conductivity, which is all the higher as the dielectric constant becomes greater.

Other ways have been investigated to produce non-aqueous electrolytes, the conductivity of which is not strictly the same as that described hereabove, but is nearer to that of the molten salts.

These investigations have shown that organic solvents of relatively low dielectric constant could be taken into consideration provided that they were used in accord with this invention.

A principal object of this invention is the provision of a non-aqueous electrolyte of high solvating power for an electrochemical generator, and more particularly for a cell comprising an anode constituted by a strongly electronegative metal such as an alkali or alkaline earth metal and a halidic or sulfidic cathode, more especially remarkable in that it comprises in combination first a solvent of high solvating power such as a heterocyclic organic compound with saturated cycle having at least one heteroatom selected from among the group consisting of sulfur and oxygen, and having a non-null dipole moment, and secondly, a non-hydrated inorganic salt of low lattice energy and high capability of solvation.

In other words, the organic compound to be used is characterized first by the presence of at least one free electron doublet on a sulfur or oxygen atom belonging to a cycle, secondly by the saturation of the said cycle, and thirdly, by an electron dissymetry causing a dipole moment of non-null value. As illustrative but non-limitative examples according to the invention, the said organic compound may be either tetra-hydrofuran or tetra-hydropyran or 4,4-dimethyl-1-3 dioxane.

The low lattice energy and the capability of solvation of the inorganic salt dissolved in the heterocyclic organic compound are found in salts comprising a large-sized anion and a small-radius cation.

The expression of the lattice energy as established by Kapustinskii, is the following for a two ion compound:

$$U = 256.1 \frac{V_A \cdot V_B \cdot \Sigma n}{r_A + r_B}$$

where

U is the lattice energy of the compound, in kilocalories,
$V_A$ is the valence of the anion,
$V_B$ is the valence of the cation,
$\Sigma n$ is the number of ions per molecule, and
$r_A$ and $r_B$ are the crystal ion radii of the anion and the cation respectively expressed in Angstroms.

As illustrative but non-limitative examples according to the invention the said anhydrous inorganic salt may be a perchlorate e.g. of lithium, magnesium or potassium, or a nitrate e.g. of lithium, sodium or potassium or else potassium hexafluorophosphate.

The anode is constituted by a strongly electronegative metal, such as an alkali or alkaline-earth metal, for example, lithium or one of the other metals of these groups: the cathode may be constituted by a halide or sulfide, e.g. cupric chloride or cupric sulfide.

Naturally, the organic heterocyclic compound must not corrode the active materials constituting the anode and the cathode respectively.

When the anode is of lithium, the use of tetrahydrofuran is particularly advantageous, and fulfills the above-mentioned requirement.

Moreover, when the anode is of lithium, the electrolytes according to the invention also have the great advantage of being able to dissolve the reaction products resulting from oxidation of the anode during the cell's electrochemical process.

Therefore, the lithium anode is hardly polarized during the operation of the cell.

Other objects and features of the invention will become apparent from the following description, together with the annexed drawings, wherein:

FIG. 3 shows the discharge curves of voltage as ordinates vs. time, as abscissae, for various discharge current densities.

Figure 1:
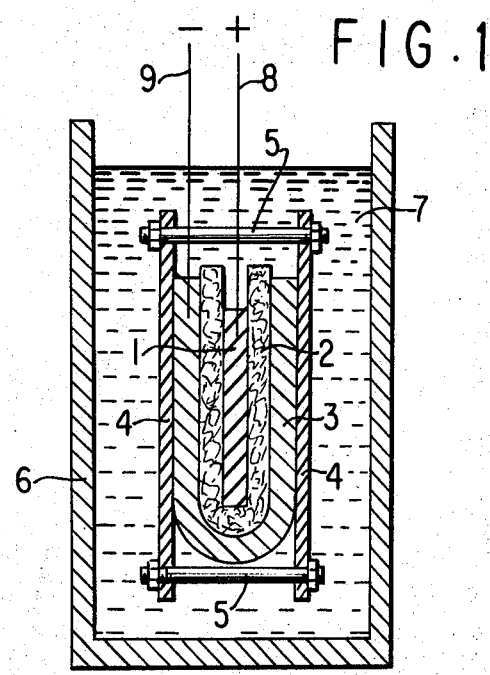
FIG. 1 is a diagrammatic view of a cell according to the invention.

Referring to the drawings:

In FIG. 1, reference numeral 1 refers to the positive electrode or cathode, which may be shaped as a small plate.

This electrode 1 may be cupric sulfide, obtained, for example, by suitable heat treatment applied after compression to a stoichiometric mixture of copper powder and flowers of sulfur. It may be a halide such as cupric chloride.

A separator 2 surrounds the cathode 1. The said separator 2 must be inert to the electrolyte. It may be made of glass wool, for instance, and be about two millimeters thick.

The anode 3 is a sheet of a strongly electronegative metal, e.g. lithium, that is U-folded in order to enfold the cathode 1 and the separator 2.

The assembly of electrode and separator is pressed between two clamping plates 4, e.g. of stainless steel, maintained together as by means of bolts or pins such as 5, and is positioned within a casing 6 which is filled with an electrolyte 7 according to the invention.

The reference numbers 8 and 9 respectively refer to leads connected respectively to cathode 1 and anode 3.

The quantity of metal used to constitute the anode 3 is greater than the amount that is needed to effect a full discharge of the cathode 1, so that the anode 3 always retains a sufficient conductivity. This excess amount may be about 50%.

According to one embodiment of the invention, the electrolyte 7 is constituted by a solution of lithium perchlorate in tetra-hydrofuran or tetra-hydropyran or 4-4-dimethyl-1-3 dioxane.

Figure 2:
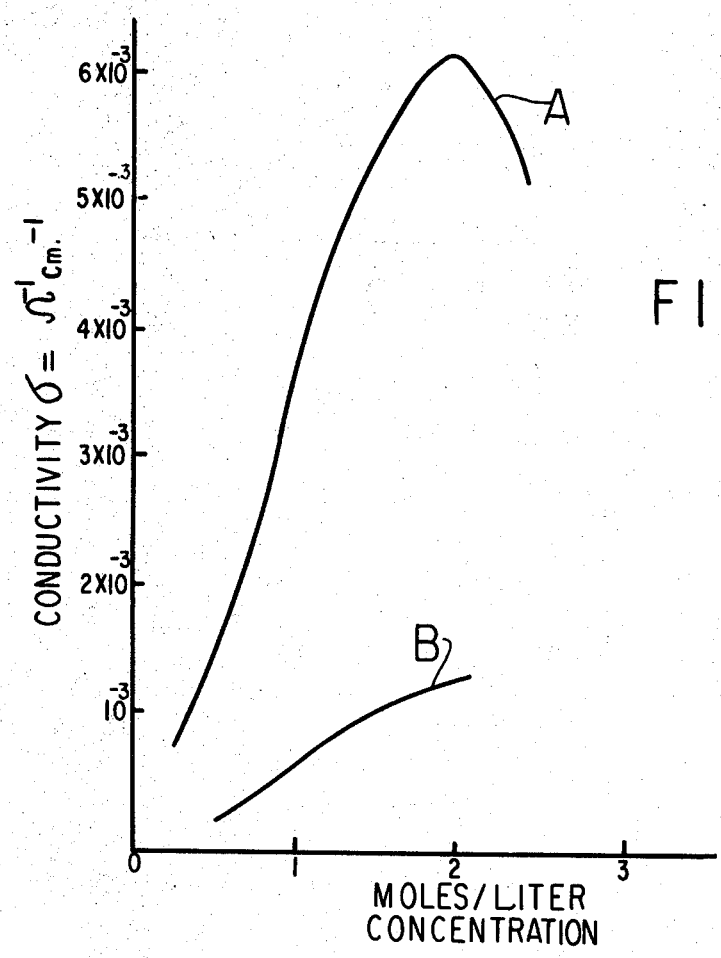
FIG. 2 shows the variations of electrolyte conductivity as ordinates plotted against the concentration of the dissolved inorganic salt, as abscissae, for two heterocyclic compounds.

In FIG. 2, the curves A and B show the variation of electrolyte conductivity in terms of concentration of lithium perchlorate dissolved in the heterocyclic organic compounds tetra-hydrofuran and tetra-hydropyran respectively.

The concentration C of lithium perchlorate is plotted as abscissae expressed in moles per liter of heterocyclic organic compounds, and the conductivity $\sigma$ as ordinates expressed in $\Omega^{-1}cm.^{-1}$.

The curve A shows that the conductivity of tetrahydrofuran is maximum at a concentration of two moles per liter.

However, a fact which must be taken into account is that the electrolyte should dissolve the products resulting from the oxidation of lithium at the anode, and that as a consequence the solubility of lithium perchlorate becomes lowered so that it may then be deposited in the solid state. If such a deposit occurs between the electrodes, the electrochemical discharge process is hindered. Moreover, since the conductivity maximum is very close to the maximum of lithium perchlorate solubility, and since a change in temperature causes a change in its solubility, lithium perchlorate at this concentration may be precipitated between the electrodes.

Experience has in fact shown that the cell operation is much disturbed by a change in temperature when the concentration of the lithium perchlorate solution is 2 moles. The difference in voltage can reach several tenths of volts for a temperature variation of about 5° to 10° C. At the same time, a white precipitate of lithium perchlorate has been observed, when the temperature decreases. On the other hand, when the concentration of the electrolyte is one mole of lithium perchlorate per liter, no perturbation has been observed.

Similar phenomenon occurs with the use of tetra-hydropyran as seen from curve B.

In order to prevent such perturbations, according to the invention, the concentration of lithium perchlorate should be between 0.25 mole and 2 moles, or preferably between 0.5 mole and 1.4 moles per liter of tetra-hydrofuran or tetra-hydropyran.

As may be seen in FIG. 3, such a cell provides a two plateau discharge, corresponding to the two steps of copper oxidation reduction; the measurements for these curves were carried out with tetra-hydrofuran as solvent. Similar results occur with tetra-hydropyran as a solvent.

The time T in FIG. 3 in hours has been plotted as abscissae and the voltage V in volts as ordinates.

Curve D corresponds to a discharge current density of 150 ma./dm.² on the positive electrode operating on both its sides.

Curve E corresponds to a discharge current density of 225 ma./dm.² on the positive electrode operating on both its sides.

Curve F corresponds to a discharge current density of 300 ma./dm.² on the positive electrode operating on both its sides.

The reactions occurring in cells of the above-described type may be written as follows:

Anode reaction
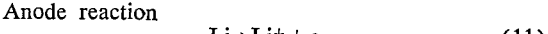
$$Li \rightarrow Li^+ + e \qquad (11)$$

Cathode reaction
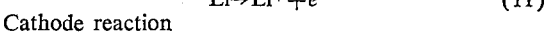
$$CuS + 2e \rightarrow Cu + S^{2-} \qquad (12)$$

Overall reaction
$$2Li + CuS \rightarrow Li_2S + Cu \qquad (13)$$

Considering that
$$2Li^+ + S^{2-} \rightarrow Li_2S \qquad (14)$$

Actually the cupric sulfide reduction is effected in two steps corresponding first to the transformation of divalent copper to monovalent copper

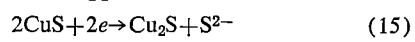
$$2CuS + 2e \rightarrow Cu_2S + S^{2-} \qquad (15)$$

followed by the reduction of monovalent copper to metal

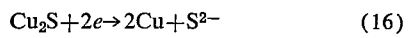
$$Cu_2S + 2e \rightarrow 2Cu + S^{2-} \qquad (16)$$

Although the electrolyte is non-aqueous, it is possible as a rough estimate to use the corresponding data of oxidation-reduction potentials of active materials in aqueous medium.

To obtain an approximate value of the potential difference given by such a cell, the following data have been taken from Oxidation States of Elements and Their Potentials In Aqueous Solutions by W. M. Latimer, Prentice Hall (2nd Edition 1952), used with European notation.

According to reaction 11, the oxidation reduction potential of lithium is:

$$E_0 = -3.045 \text{ v.}$$

According to reaction 15, the first step of cupric sulfide oxidation reduction corresponds to a potential of $$E_{01} = -0.540 \text{ v.}$$

and according to reaction 16, the second step of cuprous sulfide oxidation reduction corresponds to a potential of $$E_{02} = -0.930 \text{ v.}$$

For the first step, the potential differences would be $$2Li + 2CuS \rightarrow Li_2S + Cu_2S$$

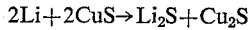
$$E_{01} - E_0 = -0.540 + 3.045 = 2.505 \text{ volts}$$

FIG. 3 gives a voltage of 1.9 v. for a discharge rate of 150 ma./dm.² (curve D), which is in good agreement with the theoretical considerations developed hereabove.

As to the second step $$2Li + Cu_2S \rightarrow Li_2S + 2Cu$$

the voltage is

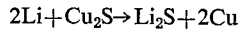
$$E_{02} - E_0 = -0.930 + 3.045 = 2.115 \text{ volts}$$

The same discharge curve gives a voltage of 1.38 v., which is again in good agreement with the stated hypotheses.

Reaction 13 shows that theoretically one gram of copper sulfide generates 560 ma.h.

Cells according to the invention have a very high efficiency as shown by the following table derived from FIG. 3. The data of this table have been computed for a final voltage of 1 v., taking into account a 50% excess of lithium used in this cell. The cathode comprised 0.950 g. of active cupric sulfide.

| Discharge current density, ma./dm.$^2$ | Average voltage accounting for the lengths of the 2 steps | Cathodic capacity Ma.h./g. | Efficiency, percent | Energy density of the Li/CuS system (active material only), wh./kg. |
|---|---|---|---|---|
| 150 | 1.65 | 506 | 90 | 760 |
| 225 | 1.65 | 490 | 87.6 | 735 |
| 300 | 1.40 | 293 | 43.4 | 368 |

It may be seen that this cell operates very well up to 225–250 ma./dm.$^2$ since the polarization substantially increases only from about 300 ma./dm.$^2$.

The outstanding behavior of the cell at discharge rates slightly higher than 150 ma./dm.$^2$ is evidenced by the very high efficiency of the cathode mass which is about 90% and by the plateaus of the discharge curve which have substantially the same slope showing that electrochemical process is regular and undisturbed.

It is well understood that the invention is in no way limited to the embodiments described and illustrated solely for exemplary purposes. Variations within the scope of the appended claims are possible and are contemplated. There is no intention, therefore, of limitation to the exact abstract or disclosure hereinabove presented.

What is claimed is:

1. An electrochemical generator comprising a positive electrode of cupric sulfide, a negative electrode of lithium, a separator between the electrodes, and a non-aqueous electrolyte of high solvating power consisting of an organic solvent of high solvating power which is a heterocyclic, saturated compound selected from the group consisting of tetrahydrofuran and tetrahydropyran, together with lithium perchlorate dissolved therein in a concentration between 0.25 and 2.0 moles per liter of said organic solvent.

2. An electrochemical generator according to claim 1 wherein the concentration of the lithium perchlorate in the organic solvent is between 0.5 mole and 1.4 moles per liter of the organic solvent.

3. An electrochemical generator according to claim 1 wherein said electrolyte consists of a solution of the inorganic salt in the heterocyclic organic compound and wherein the inorganic salt is lithium perchlorate and the heterocyclic inorganic compound is solely tetra-hydropyran, the concentration of the lithium perchlorate being between 0.25 mole and 2 moles per liter of tetra-hydropyran.

4. An electrochemical generator according to claim 1 wherein the concentration of the lithium perchlorate is between 0.5 mole and 1.4 moles per liter of tetra-hydropyran.

5. An electrochemical generator comprising a positive electrode of cupric sulfide, a negative electrode of lithium, a separator between the electrodes and a non-aqueous electrolyte of high solvating power consisting of tetrahydrofuran organic solvent together with inorganic lithium perchlorate dissolved therein in a concentration between 0.25 and 2 moles per liter of the organic solvent.

6. An electrochemical generator according to claim 5 wherein the concentration of lithium perchlorate is between 0.5 and 1.4 moles per liter of the organic solvent.

7. An electrochemical generator according to claim 5 wherein one of the electrodes is of substantially U-shape surrounding the other electrode, and including means to clamp the electrodes and separator together.

8. An electrochemical cell according to claim 5 wherein said separator is inert to the electrolyte.

9. An electrochemical cell according to claim 8 wherein said separator is glass wool approximately 2 mm. thick.

10. An electrochemical cell according to claim 5 wherein the anode has a metal content that is in excess of the necessary amount required to effect a full discharge of the cathode.

11. An electrochemical cell according to claim 10 wherein said excess metal content is approximately 50%.

References Cited

UNITED STATES PATENTS

| 3,393,093 | 7/1968 | Shaw et al. | 136—155X |
| 3,415,687 | 12/1968 | Methlie | 136—15X |
| 3,423,242 | 1/1969 | Meyers et al. | 136—154X |
| 3,468,716 | 9/1969 | Eisenberg | 136—154X |

OTHER REFERENCES

Hill et al., Research and Development of a High Capacity, Nonaqueous Secondary Battery, prepared for NASA, Aug. 15, 1965, P. R. Mallory & Co. Burlington, Mass., pp. 1–4, and 109–126.

DONALD L. WALTON, Primary Examiner

U.S. Cl. X.R.

136—100